United States Patent [19]

Levi

[11] Patent Number: 5,297,912
[45] Date of Patent: Mar. 29, 1994

[54] LADDER RACK FOR MOTOR VEHICLES

[75] Inventor: Avraham Y. Levi, St. Paul, Minn.

[73] Assignee: JAJ Products, Inc., Bloomington, Minn.

[21] Appl. No.: 892,849

[22] Filed: Jun. 3, 1992

[51] Int. Cl.$^5$ .............................................. B60P 9/00
[52] U.S. Cl. ...................... 414/462; 414/546; 414/680
[58] Field of Search .............. 414/462, 546, 680; 224/310, 315, 324

[56] References Cited

U.S. PATENT DOCUMENTS

| | | | |
|---|---|---|---|
| 3,058,607 | 10/1962 | Kiley | 414/462 |
| 3,963,136 | 6/1976 | Spanke | 224/310 |
| 4,808,056 | 2/1989 | Oshima | 414/462 |
| 5,058,791 | 10/1991 | Henriquez et al. | 224/310 |

FOREIGN PATENT DOCUMENTS 2399366  4/1979  France .................... 414/462

Primary Examiner—David H. Bollinger
Attorney, Agent, or Firm—Haugen and Nikolai

[57] ABSTRACT

An apparatus for facilitating the loading and unloading of heavy ladders from the roof of a motor vehicle comprises a pair of 4-bar linkages that are appropriately affixed to the transversely extending luggage rack members secured to the roof of the vehicle. A connector rod is operatively coupled between the pair of 4-bar linkages and to a crank or other suitable drive member for elevating and rotating the load from a position parallel to the roof of the vehicle to a disposition parallel to one side of the vehicle.

14 Claims, 4 Drawing Sheets

LADDER RACK FOR MOTOR VEHICLES

BACKGROUND OF THE INVENTION

1. Field of the Invention

This invention relates generally to a labor-saving device for use in loading and unloading heavy ladders onto and from the roof of a motor vehicle such as a car or van and more particularly to a manually or motor-operated ladder support mechanism for transporting one or more ladders resting thereon from a transport position on top of the vehicle to a location alongside the vehicle where the ladders can be readily removed and later reloaded.

2. Discussion of the Prior Art

Workmen, such as painters, electricians, plumbers, etc. require ladders in their work. When a smaller vehicle such as a station wagon or a van is to be used, it is common practice to secure the ladders to a luggage rack affixed to the roof of the vehicle. This may be accomplished using bungie chords, ropes, or the like. With ladders of any size, it is somewhat difficult for one person to place and remove a heavy ladder from the vehicle's roof. Because of the cumbersome nature of the task, there is a high likelihood of doing damage to the vehicle or doing injury to the person.

In the Spanke U.S. Pat. No. 3,963,136 there is described a retractable ladder rack adapted to be mounted on the top of a vehicle and which includes a curved arcuate rail which is attached to the top of the vehicle. A plurality of roller members are adapted to ride in a channel formed in the rail. The rack is supported on the rollers to permit it to move along the channel so that ladders placed on the rack can be effectively rolled from a centered position on the roof to a position that is adjacent the vehicle's side.

The present invention is deemed to be an improvement over the device described in the Spanke '136 patent in that while it is equally effective in moving ladders from a stored position on the roof to a convenient position along the side of the vehicle from which they can be lifted and carried, the present invention is substantially simpler in its construction and can be produced at a substantially lower cost.

SUMMARY OF THE INVENTION

In accordance with the present invention, there is provided an apparatus for facilitating the loading and unloading of one or more ladders from the roof of a motor vehicle. It comprises first and second 4-bar linkage assemblies which are adapted to be attached by bolts or otherwise to the roof of the vehicle or to conventional luggage rack commonly found on the roof of station wagons, vans, etc. Each of the 4-bar assemblies has one bar affixed to the roof or luggage rack as the case may be and the other bar joined to the first bar by first and second, spaced apart, rigid links of differing length which are pivotally joined between the stationary bar and the movable one. A connecting rod extends longitudinally between the first and second 4-bar linkage assemblies and means are provided for conveniently rotating the connecting rod to thereby displace the movable bar on which the ladders rest between a first disposition parallel to the roof of the vehicle and a second disposition aligned with one side of that vehicle. More particularly, the connecting rod may be rotated using a hand-crank having a sufficiently long lever arm to allow a person to actuate the 4-bar linkages in the manner described when one or more ladders are resting upon the movable bar. Alternatively, it is contemplated that the crank may be replaced with an electric motor and gear box to drive the connecting rod.

DESCRIPTION OF THE DRAWINGS

The foregoing features, objects and advantages of the invention will become apparent to those skilled in the art from the following detailed description of a preferred embodiment, especially when considered in conjunction with the accompanying drawings in which like numerals in the several views refer to corresponding parts.

FIG. 7 shows a DC motor drive for operating the ladder rack mechanism of FIG. 1.

DESCRIPTION OF THE PREFERRED EMBODIMENT

Figure 1:
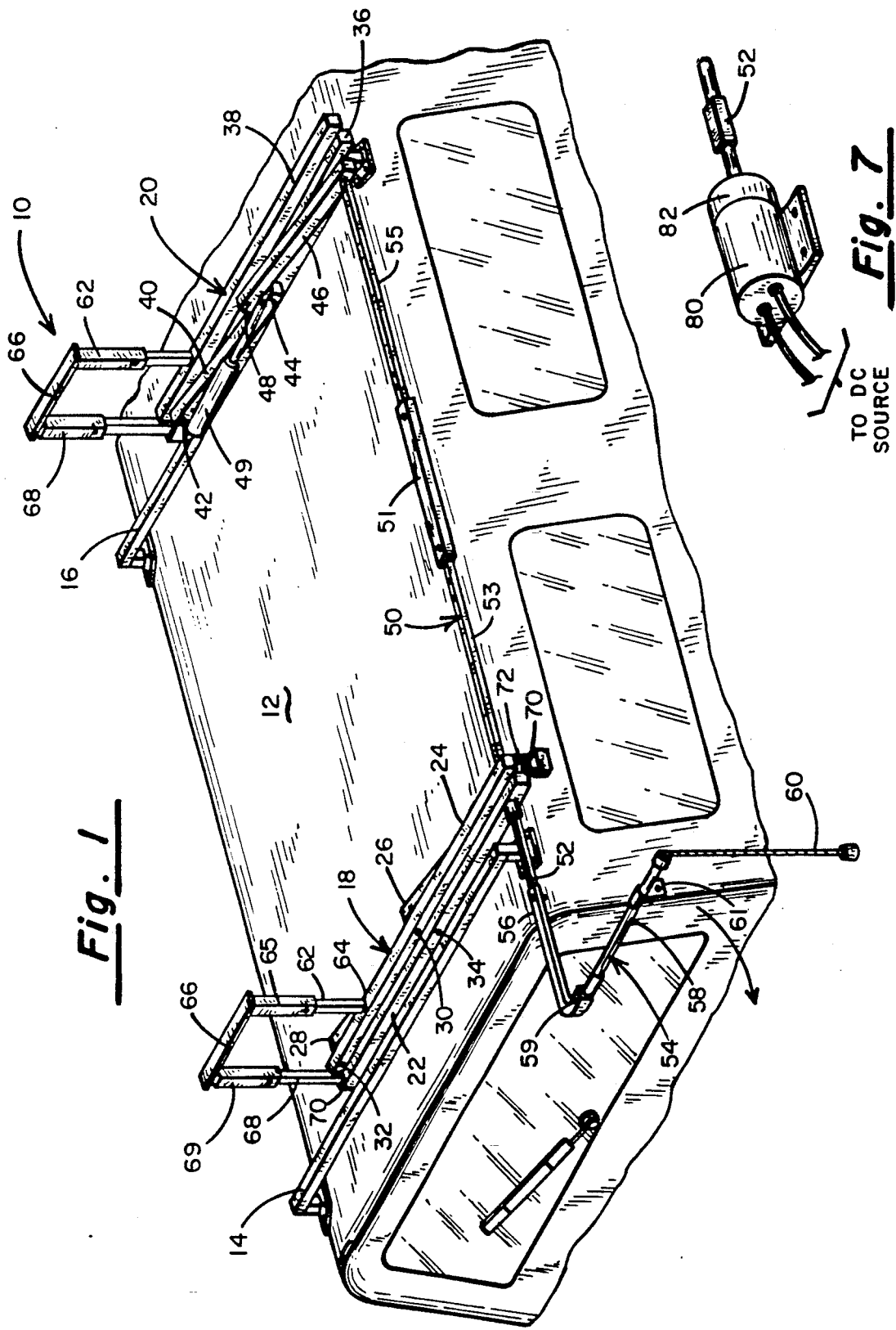
FIG. 1 is a partial perspective view of a motor vehicle with the ladder rack mechanism of the present invention affixed to its roof.

Referring first to FIG. 1, there is indicated generally by numeral 10 the luggage rack mechanism in accordance with the preferred embodiment of the invention. It is shown as being mounted on the roof 12 of a motor vehicle such as a station wagon, van, or panel truck. While it can be affixed directly to the roof, it is illustrated as being affixed to a convention luggage rack. More particularly, secured in a conventional fashion to the roof 12 are first and second luggage rack members 14 and 16. Affixed to those luggage rack members by bolts or otherwise is the ladder rack 10 of this invention.

The ladder itself comprises first and second 4-bar linkages, the rear one identified generally by numeral 18 and the front one by numeral 20. The 4-bar linkage assembly 18 is seen to include a first rigid tube 22 of generally rectangular cross-section. It is this member that is attached to the luggage rack 14 by bolts, clamps or other suitable means. A second rectangular bar 24 comprises the movable ladder rest and it is coupled to the member 22 by a pair of link members including links 26 and 28. The link 26 is pivotally secured to the member 24 by a pin 30. The link 28 is pivotally joined to the ladder rest member 24 by a pin 32 and to the lower stationary bar 22 by a pin 34. As will be explained, the lengths of links 26 and 28 and their points of attachment determine the path of travel of the movable ladder rest 24. Connected between a stud attached to the stationary bar 22, and an ear affixed to one end of the link 28 is a conventional shock absorber or snubber 35 of the type commonly used to activate a tailgate or hatchback of a passenger car. It includes a piston and a fluid containing cylinder and is operative to prevent sudden movement of the movable member 24 relative to the stationary tube member 22.

The front 4-bar linkage assembly 20 is substantially identical to the rear one 18 just described. It includes a stationary bar 36 which is bolted or otherwise affixed to the front luggage rack member 16 and a front ladder rest member 38. The two are joined together by a rigid link member 40 which is longer than the link 46 and is pivotally joined by a pin 42 to the ladder rest member 38 and by a pin 44 to the lower or stationary bar member 36. The rigid link 46 is shorter than the link 40 and is pivotally attached to member 38 by a pin 48. It, too, includes a shock absorber or snubbing 49 operatively coupled between one end of the stationary bar 36 and the linkage member 40.

Journaled for rotation in sleeve bearings disposed in the stationary bars 22 and 36 is a longitudinally extending connecting rod assembly 50. The connecting rod 50 is extendable in length via telescoping control segment 51 into which the remaining segments 53 and 55 slidingly fit. It has a rectangular cross-section and passes through a square aperture formed in the lower ends of the links 26 and 46 with a zero clearance.

The connecting rod assembly 50 has a portion 52 thereof extending rearwardly beyond its cylindrical journal within the stationary member 22 and affixed to the terminal end of the segment 52 is a "L"-shaped crank, indicated by numeral 54. The crank includes a first segment comprising a tube of generally rectangular cross-section, as at 56, of a size adapted to fit over and surround the end portion 52 of the connecting rod 50. Connected to the member 56 is a second segment comprising a handle 58, the two being hinged together at point 59 allowing the crank to be folded. A rope tether 60 is affixed to the terminal end of the handle 58, the purpose of which will become apparent as the description of the invention continues.

To retain the ladders during transportation and to prevent theft thereof, means are provided for preventing a ladder from being removed from its stored position on the vehicle. It includes a vertically extending post 62 which is welded at one end 64 to the upper surface of the ladder rest member 24. A telescoping extension 65 which can be fastened at various points along the length of post 62 allows for adjustment of the overall length of the ladder retainer. This allows plural ladders to be stacked one atop the other. Welded to the upper end of the extension 65 is a transversely extending plate 66. When the mechanism of the present invention is in its orientation illustrated in FIGS. 1 and 4 of the drawings, the plate 66 closely abuts the upper end of a telescoping post assembly 68–69 which is welded at its lower end 70 to the stationary bar 22. An identical adjustable length ladder restraining mechanism is used with the front 4-bar linkage assembly 20.

When a ladder 71 (FIGS. 4–6) is being transported or stored on the roof 12 of the vehicle, one side rail 73 of the ladder will pass between the vertical posts 62–65 and 68–69 while the other rail 75 is unconstrained and resting upon the ladder rest members 24 and 38. A padlock 70 passing through aligned apertures formed in projecting ears 72 and 74 on the ends of members 26 and 22, respectively, prevents operation of the ladder rack and precludes removal of any ladder that may be resting on the ladder rack assembly. When the crank handle 58 is folded at hinge 59, the apertured ear 61 welded to handle 58 also aligns with the ears 72 and 74 so that the lock 70 prevents unauthorized deployment of the crank handle.

Figure 2:
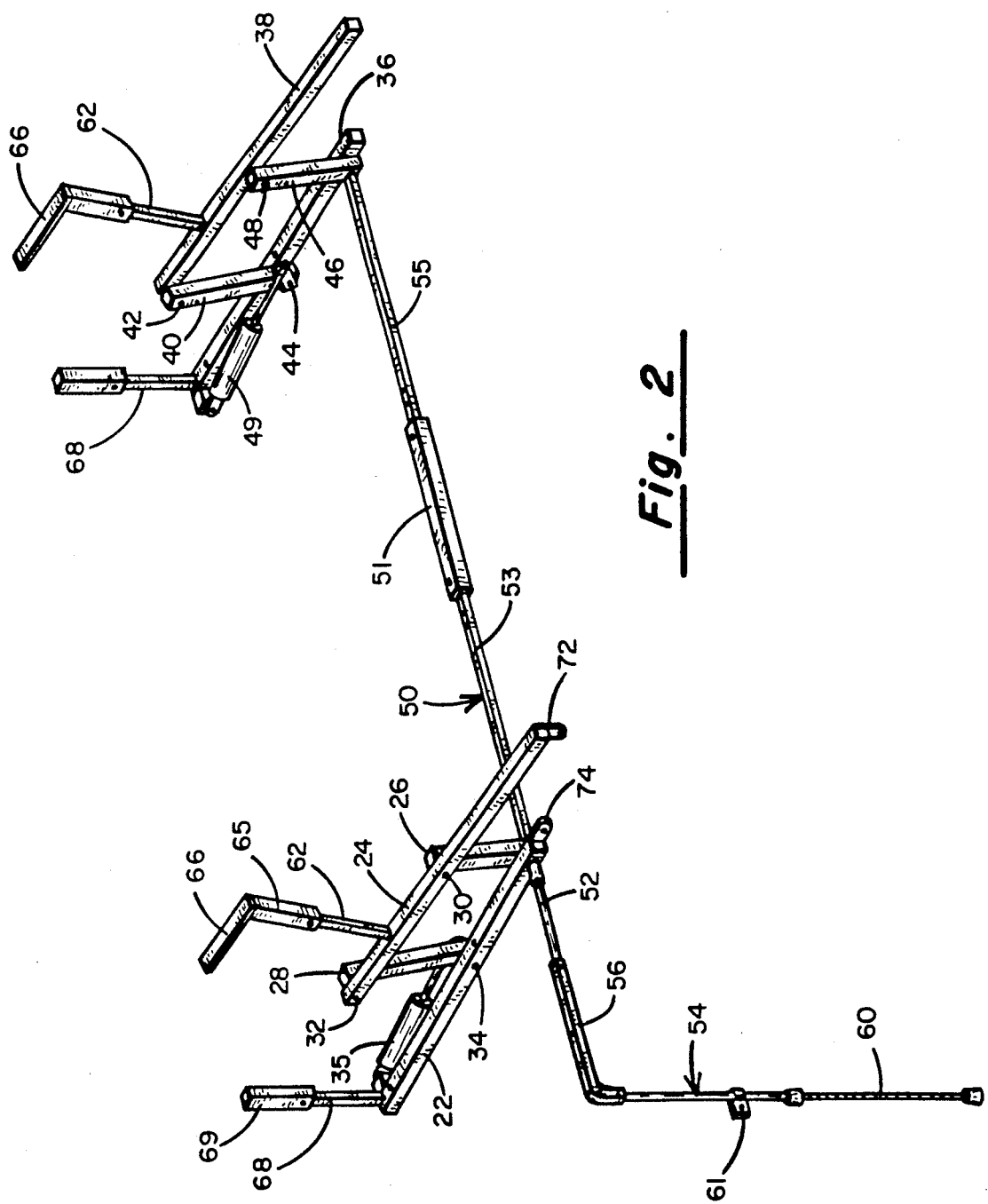
FIG. 2 is a partial perspective view of the vehicle roof mounted mechanism in a partially deployed orientation.
Figure 3:
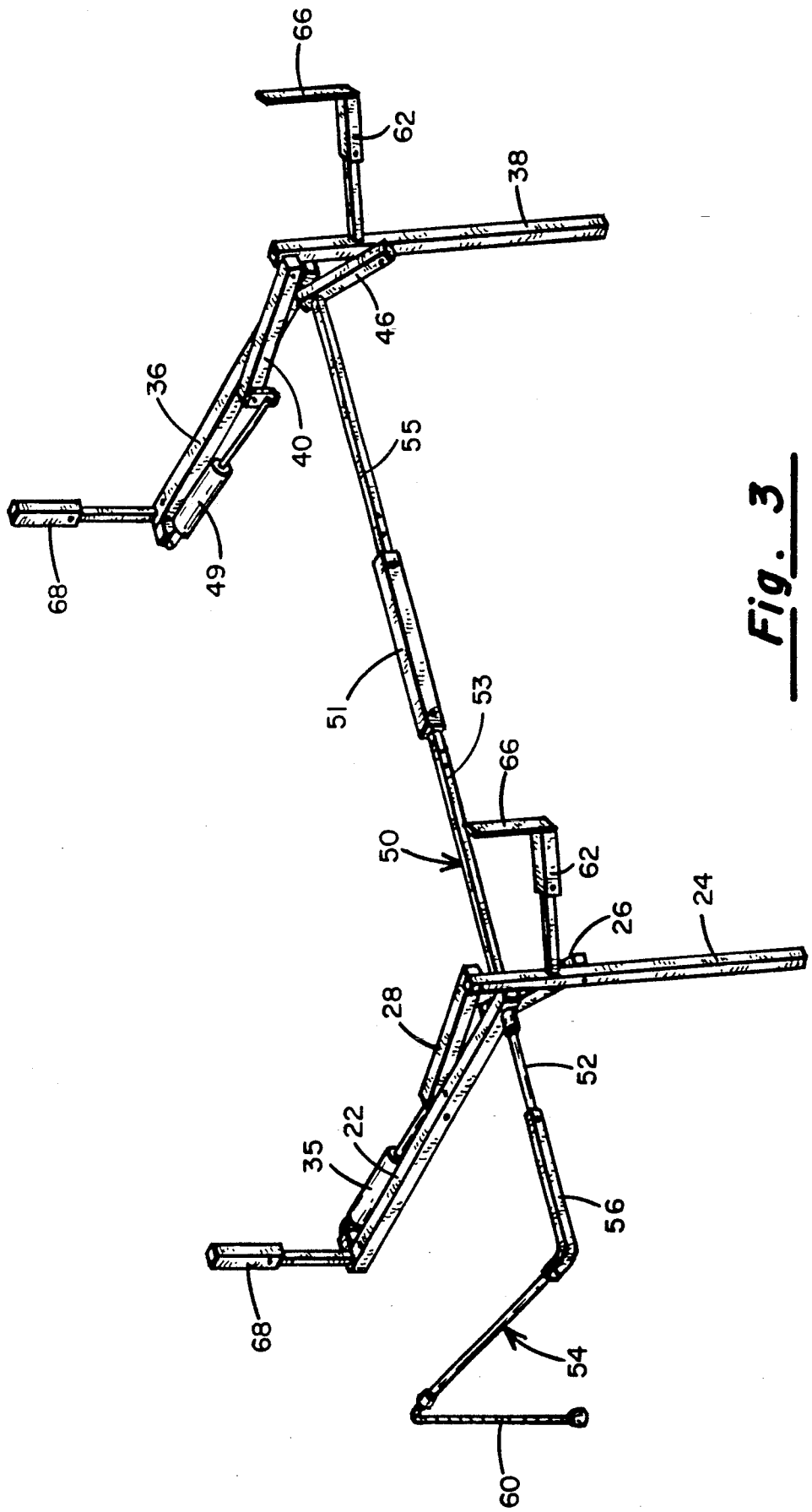
FIG. 3 is a view of the mechanism of FIG. 1 in its fully deployed disposition.
Figure 5:
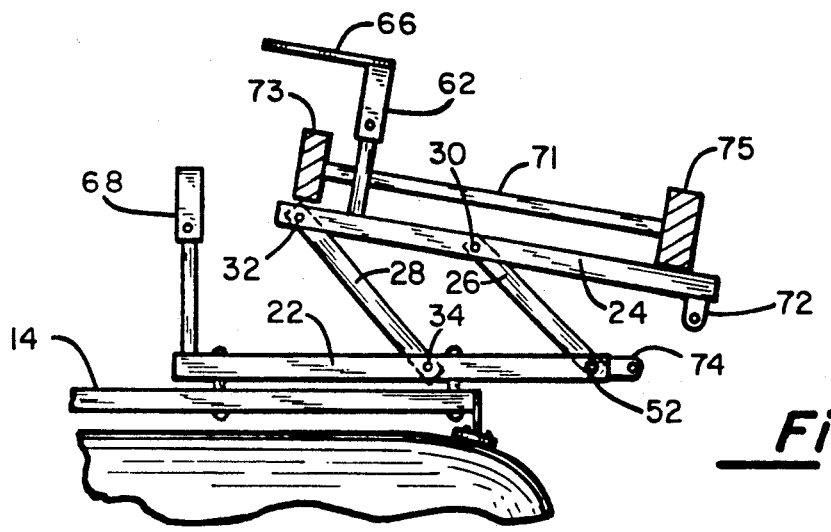
FIG. 5 is a rear end view of the apparatus when in the disposition shown in FIG. 2.

When it is desired to use the ladder and remove same from the roof of the vehicle, the padlock is removed and because the crank 54 has the free end of the portion 56 slipped over the square end of the connecting rod 52, when it is turned in the direction of the arrow in FIG. 1, the rigid links 26 and 46 will be rotated in the clockwise direction when viewed as in the drawings and, in doing so, the rear and front ladder rest members 24 and 34 will be elevated and rotated first to the disposition illustrated in FIGS. 2 and 5 of the drawings. As the crank is further rotated, a point is reached where the weight of the ladders acting on the posts 62 will over-center, tend to carry the crank. The operator must then restrain any tendency for the ladders to slam into the position shown in FIG. 6 by grasping the rope tether 60 and slowly allowing the lever 56 to rise up to its most elevated position, i.e., that shown in FIG. 3. The shock absorber 35 and 49 help restrain the ladders from sudden movement in going from the stowed position to the position shown in FIG. 5, and vice-versa.

Figure 6:
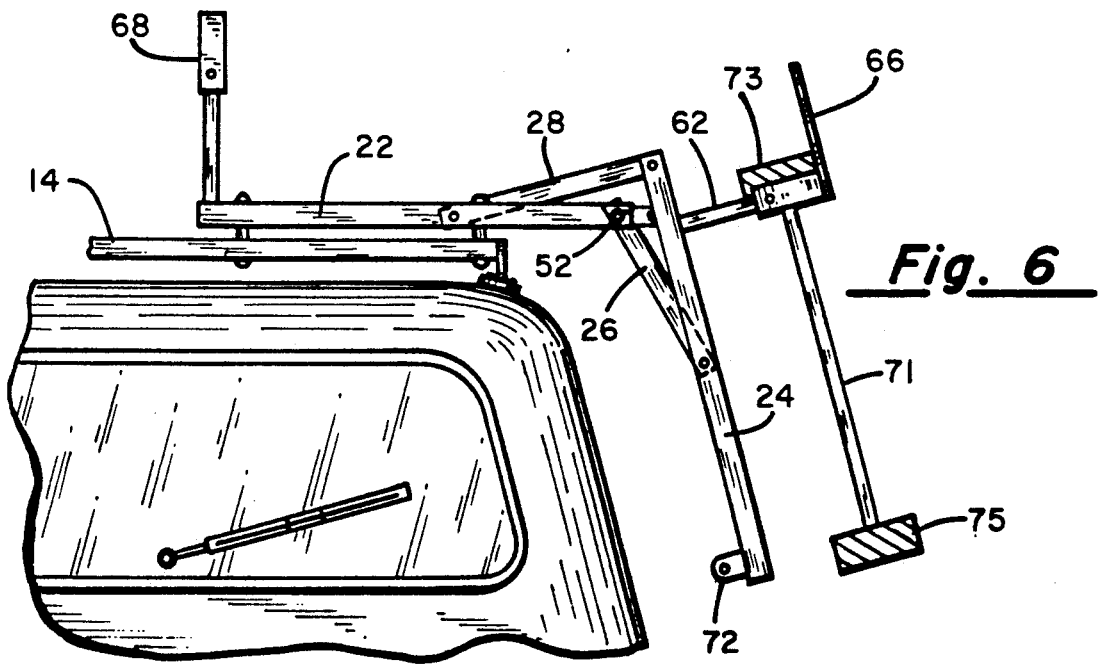
FIG. 6 is a rear end view with the roof rack apparatus in the fully deployed position represented in FIG. 3.

At this point and as is best illustrated in the view of FIG. 6, the ladder 71 is positioned parallel to and spaced from the side of the vehicle and at an elevation that allows it to be easily lifted over the plate 66 onto the operator's shoulder at the ladder's balance point so that it can be carried to the work site.

Figure 4:
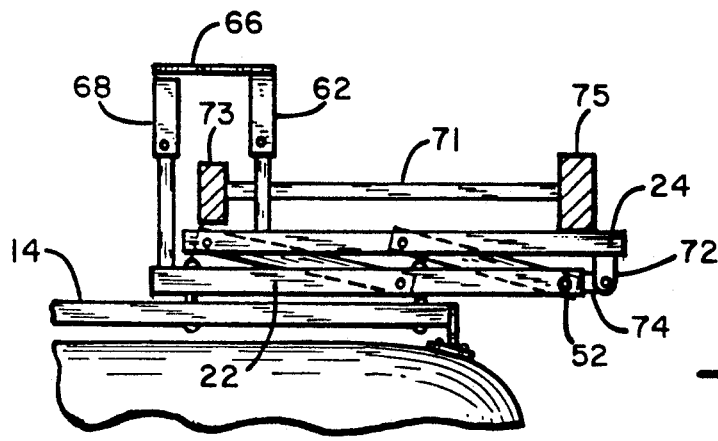
FIG. 4 is a rear end view of the roof mounted ladder rack in the position corresponding to that shown in FIG. 1.

To again load a ladder onto the roof of the vehicle, the sequence represented by FIGS. 4, 5 and 6 is reversed. More particularly, the operator will again position the ladder over the plates 66 of the front and rear 4-bar linkages 18 and 20 and then by grasping the rope and pulling downward on it, the crank will be rotated in the counter-clockwise direction to the point where the operator may grasp the handle 54 and continue its rotation in the counter-clockwise direction until the assembly moves through the disposition shown in FIG. 5 to that shown in FIG. 4, with the ladder 71 resting above the vehicle's roof. With the crank handle 58 approximately three feet in length, an adult can readily manipulate the ladder rack when supporting ladders weighing 130 pounds or more.

It is also contemplated that instead of using a crank 54 to rotate the connecting rod 50 to operate the 4-bar linkages, the crank may be replaced with a direct current motor, as at 80 in FIG. 7, suitably connected to the vehicle's 12-volt electrical supply. A suitable gear box 82 driven by the motor and coupled to the connecting rod end 52 can then be used to operate the mechanism.

While the present invention has been described in detail with respect to a certain preferred embodiment of the invention, it is understood that those skilled in the art could make various changes and modifications to the preferred embodiment without departing from the spirit and scope of the invention. It is, therefore, the intent of the following claims to cover all such changes and modifications.

What is claimed is:

1. Apparatus for facilitating the loading and unloading of a ladder from the roof of a motor vehicle, comprising, in combination:

(a) a first and a second 4-bar linkage assembly, each including a stationary bar member attached to the roof of a motor vehicle in parallel, spaced-apart relation so as to extend transverse to the longitudinal axis of said motor vehicle and a movable bar member comprising a ladder rest pivotally coupled to said stationary bar member by a pair of rigid links of unequal length, said pair of rigid links sized and positioned such that rotation of one of said pair of rigid links on each of said first and second 4-bar linkage assemblies results in said movable bar members comprising said ladder rests moving between a first disposition which is generally parallel to said roof and a second disposition aligned with and spaced from one side of said vehicle;

(b) a connector rod of adjustable length extending longitudinally between said first and second 4-bar linkage assemblies with said connecting rod journaled for rotation in said stationary bar member of each of said 4-bar linkage assemblies and operatively coupled to said one of said pair of rigid links in each of said 4-bar linkage assemblies; and (c) means for rotating said connecting rod and thereby rotating said one of said pair of rigid links on each of said first and second 4-bar linkage assemblies.

2. The apparatus as in claim 1 and further including shock absorber means operatively coupled between said stationary bar member of one of said first and second four-bar linkages and said movable bar member of said one of said first and second four-bar linkages for resisting sudden movement of said movable bar member relative to said stationary bar member.

3. The apparatus as in claim 1 and further including shock absorber means having a piston disposed in a fluid containing cylinder, one of said piston and cylinder being connected to said stationary member of one of said first and second four-bar linkages and the other of said piston and cylinder being coupled to one of said pair of rigid links of said one of said first and second four-bar linkages.

4. The apparatus as in claim 1 wherein said means for rotating said one of said rigid links includes said connector rod.

5. The apparatus as in claim 4 wherein said means for rotating said one of said rigid links comprises a crank coupled to said connector rod.

6. The apparatus as in claim 5 wherein said crank includes first and second segments hinged to one another, the first segment comprising a crank handle member and the second segment being coupled to said connector rod.

7. The apparatus as in claim 6 wherein said crank handle member extends beyond the rear of said vehicle when said second segment is coupled to said connector rod.

8. The apparatus as in claim 6 and further including means for locking said crank handle to said movable bar member of one of said first and second four-bar linkages and said stationary bar member of said one of said first and second four-bar linkages when said movable bar member of said one of said first and second four-bar linkages is in said first disposition.

9. The apparatus as in claim 1 wherein said means for rotating said one of said rigid links includes an electric motor operatively coupled to said one rigid link.

10. The apparatus as in claim 1 wherein said connector rod is journaled for rotation near each end thereof in said stationary bar members of said first and second 4-bar linkage assemblies.

11. The apparatus as in claim 1 and further including means for locking said movable bar member of one of said first and second four-bar linkages to said stationary bar member of said one of said first and second four-bar linkages when said movable bar member is in said first disposition.

12. Apparatus for facilitating the loading and unloading of a ladder from the roof of a motor vehicle, comprising, in combination:

(a) a first 4-bar linkage assembly including a stationary bar member attached to the roof of a motor vehicle so as to extend transverse to the longitudinal axis of said motor vehicle and a movable bar member comprising a ladder rest pivotally coupled to said stationary bar member by a pair of rigid links of unequal length, said pair of rigid links sized and positioned such that rotation of one of said pair of rigid links results in said movable bar member comprising said ladder rest moving between a first disposition which is generally parallel to said roof and a second disposition aligned with and spaced from one side of said vehicle;

(b) a second 4-bar linkage assembly, identical to said first 4-bar linkage assembly, and attached to said roof in said parallel, spaced-apart relation to said first 4-bar linkage assembly;

(c) first and second pairs of cooperating ladder constraint members, each of said pairs including a first rigid rod affixed to and projecting perpendicularly from said bars comprising said ladder rest on each of said 4-bar linkage assemblies, a second rigid rod projecting perpendicularly from said stationary bars of each of said 4-bar linkage assemblies and a cross-member affixed to the free end of one of said first and second rigid rods and bridging said free ends of said first and second rigid rods to create a frame for surrounding a portion of a ladder resting upon said movable bar when said movable bar is in said first disposition; and (d) means for rotating said one of said pair of rigid links on each of said first and second 4-bar linkage assemblies simultaneously.

13. The apparatus as in claim 12 wherein said first and second rigid rods of each pair is extendable in length.

14. Apparatus for facilitating the loading and unloading of a ladder from the roof of a motor vehicle, comprising, in combination:

(a) a first and a second 4-bar linkage assembly, each including a stationary bar member attached to the roof of a motor vehicle in parallel, spaced-apart relationship to one another and extending transversely to the longitudinal axis of said motor vehicle and a movable bar member comprising a ladder rest pivotally coupled to said stationary bar member on each of said first and second 4-bar linkage assemblies by a pair of rigid links of unequal length, said links being sized and positioned such that rotation of one of said pair of rigid links results in said movable bar member comprising said ladder rest moving between a first disposition which is generally parallel to said roof and a second disposition aligned with and spaced from one side of said vehicle;

(b) a connecting rod extending longitudinally between said first and second 4-bar linkage assemblies, said connecting rod being journaled for rotation in said stationary bar member of each of said 4-bar linkage assemblies, and coupled to said one of said rigid links in each of said first and second 4-bar linkage assemblies wherein rotation of said connecting rod rotates said one of said pair of rigid links in each of said 4-bar linkage assemblies;

(c) crank means including first and second segments hinged to one another with said first segment comprising a crank handle member and said second segment being coupled to said connecting rod; and (d) a tether secured to said crank handle member.

* * * * *